United States Patent
Ishihara et al.

(10) Patent No.: US 9,203,071 B2
(45) Date of Patent: Dec. 1, 2015

(54) MULTI-LAYER MICROPOROUS FILM

(75) Inventors: Takeshi Ishihara, Nasushiobara (JP); Satoshi Miyaoka, Nasushiobara (JP)

(73) Assignee: Toray Battery Separator Film Co., Ltd. (JP)

( * ) Notice: Subject to any disclaimer, the term of this patent is extended or adjusted under 35 U.S.C. 154(b) by 240 days.

(21) Appl. No.: 13/322,663

(22) PCT Filed: Jun. 8, 2010

(86) PCT No.: PCT/US2010/037762
§ 371 (c)(1),
(2), (4) Date: Nov. 28, 2011

(87) PCT Pub. No.: WO2010/147800
PCT Pub. Date: Dec. 23, 2010

(65) Prior Publication Data
US 2012/0077073 A1    Mar. 29, 2012

Related U.S. Application Data

(60) Provisional application No. 61/218,720, filed on Jun. 19, 2009, provisional application No. 61/298,756, filed on Jan. 27, 2010, provisional application No. 61/298,752, filed on Jan. 27, 2010, provisional application No. 61/346,675, filed on May 20, 2010, provisional application No. 61/351,380, filed on Jun. 4, 2010.

(51) Int. Cl.
*H01M 2/16* (2006.01)
*H01M 10/0525* (2010.01)
*B32B 27/32* (2006.01)
*H01M 2/14* (2006.01)

(52) U.S. Cl.
CPC ............. *H01M 2/16* (2013.01); *B32B 27/32* (2013.01); *H01M 2/145* (2013.01); *H01M 2/1686* (2013.01); *H01M 10/0525* (2013.01); *Y02E 60/12* (2013.01); *Y02T 10/7011* (2013.01); *Y10T 428/249978* (2015.04)

(58) Field of Classification Search
CPC ..... H01M 2/1686; H01M 2/16; H01M 2/145; H01M 10/0525
See application file for complete search history.

(56) References Cited

U.S. PATENT DOCUMENTS

| | | |
|---|---|---|
| 4,873,037 A | 10/1989 | Chau et al. |
| 5,084,534 A | 1/1992 | Welborn, Jr. et al. |
| 5,453,333 A | 9/1995 | Takauchi et al. |
| 5,534,593 A | 7/1996 | Friedman |
| 5,616,246 A | 4/1997 | Gagnon et al. |
| 6,100,334 A | 8/2000 | Abdou-Sabet |
| 8,338,020 B2 | 12/2012 | Ishihara et al. |
| 2002/0168564 A1 | 11/2002 | Wensley |
| 2006/0204854 A1 | 9/2006 | Fujimoto et al. |
| 2007/0120526 A1 | 5/2007 | Kumeuchi et al. |
| 2007/0128512 A1 | 6/2007 | Kaimai et al. |
| 2007/0160902 A1 | 7/2007 | Ando et al. |
| 2009/0117453 A1* | 5/2009 | Kikuchi et al. ............... 429/145 |
| 2009/0117455 A1* | 5/2009 | Takita et al. .................. 429/145 |
| 2009/0134538 A1* | 5/2009 | Takita et al. ..................... 264/28 |
| 2009/0148761 A1* | 6/2009 | Kikuchi et al. ............... 429/145 |
| 2009/0169862 A1 | 7/2009 | Rhee et al. |
| 2009/0186279 A1 | 7/2009 | Brant et al. |
| 2009/0269672 A1 | 10/2009 | Takita et al. |
| 2010/0003588 A1 | 1/2010 | Sudou et al. |
| 2011/0236745 A1* | 9/2011 | Brant et al. ................... 429/145 |

FOREIGN PATENT DOCUMENTS

| | | | |
|---|---|---|---|
| JP | 2004-018660 | 1/2004 | |
| JP | 2005-171230 | 6/2005 | |
| WO | 97/23554 | 7/1997 | |
| WO | 2007/037289 A1 | 4/2007 | |
| WO | 2007/052663 | 5/2007 | |
| WO | 2007/132942 | 11/2007 | |
| WO | 2008/016174 | 2/2008 | |
| WO | 2008/018584 | 2/2008 | |
| WO | WO 2008/016174 | * 2/2008 | ............. B32B 27/32 |
| WO | 2008/140835 | 11/2008 | |

OTHER PUBLICATIONS

Patrick Brant et al. "Effect of Tacticity on the Dilute Solution Coil Dimensions of Poly (α-olefins)s", Mar. 8, 2005, vol. 38, pp. 7181-7183, *Macromolecules*, American Chemical Society.

Sun, T. et al., "Effect of Short Chain Branching on the Coil Dimensions of Polyolefins in Dilute Solution," *Macromolecules*, 2001, vol. 34, No. 19, pp. 6812-6820 (1 pages Abstract).

US Official Action dated Dec. 9, 2013 for U.S. Appl. No. 13/322,932.

* cited by examiner

*Primary Examiner* — Barbara Gilliam
*Assistant Examiner* — Angela Martin
(74) *Attorney, Agent, or Firm* — DLA Piper LLP (US)

(57) ABSTRACT

The invention relates to microporous membranes having at least two layers, a first layer comprising polymethylpentene and a second layer which comprises a polymer and has a composition that is not substantially the same as that of the first layer. The invention also relates to methods for making such membranes and the use of such membranes as battery separator film in, e.g., lithium ion batteries.

25 Claims, No Drawings

MULTI-LAYER MICROPOROUS FILM

CROSS-REFERENCE TO RELATED APPLICATIONS

The present application claims priority from U.S. Ser. No. 61/346,675, filed May 20, 2010, and claims the benefit of and priority from U.S. Ser. No. 61/298,752, filed Jan. 27, 2010; U.S. Ser. No. 61/298,756, filed Jan. 27, 2010; U.S. Ser. No. 61/218,720, filed Jun. 19, 2009; and U.S. Ser. No. 61/351,380, filed Jun. 4, 2010, all of which are incorporated by reference in their entirety.

FIELD OF THE INVENTION

The invention relates to microporous membranes having at least two layers, a first layer comprising polymethylpentene and a second layer which comprises a polymer and has a composition that is not substantially the same as that of the first layer. The invention also relates to methods for making such membranes and the use of such membranes as battery separator film in, e.g., lithium ion batteries.

BACKGROUND OF THE INVENTION

Microporous membranes can be used as battery separator film ("BSF") in, e.g., lithium ion batteries. Large-capacity batteries such as those that can be used to power electric vehicles and hybrid electric vehicles could be improved by increasing the BSFs meltdown temperature, puncture strength, and electrolyte affinity without significantly decreasing other important membrane properties such as porosity, permeability, and thermal stability (heat shrinkage). Increasing strength is important because it reduces the risk of internal short circuits resulting from BSF failure. Improved electrolyte affinity leads to improved battery manufacturing yield, resulting from the decreased time needed to equilibrate the electrode-electrolyte-BSF assembly.

Microporous membranes comprising polymer have been used as BSFs in lithium ion batteries to provide a fail-safe feature at elevated battery temperature. Such membranes have increased polymer mobility at elevated battery temperature, which leads to a significant permeability decrease. This effect (called "shutdown") is beneficial because the BSF's diminished permeability above the shutdown temperature results in a decrease in battery electrochemical activity, thereby lessening the risk of battery failure under overcharge, rapid-discharge, or other high-temperature battery conditions. Since battery internal temperature can continue to increase even at reduced electrochemical activity, it is desirable to increase the BSF's thermal stability at elevated temperature to further lessen the risk of battery failure. One measure of thermal stability, the BSF's meltdown temperature, is related to the maximum temperature at which the BSF is able to electrically separate the battery's anode and cathode. A BSF's meltdown temperature can be increased by including a high melting-point species (e.g., polypropylene) in the BSF's polymer to increase the BSF's meltdown temperature.

Monolayer BSFs comprising (i) polymethylpentene and polyethylene and (ii) polymethylpentene and polypropylene have meltdown temperatures ≥200° C., but these films have a lower pin puncture strength and less electrolyte affinity than BSFs comprising polyethylene and/or polypropylene.

SUMMARY OF THE INVENTION

In an embodiment, the invention relates to a multilayer microporous membrane comprising:

i. a first layer comprising ≤20.0 wt % polymethylpentene, based on the weight of the first layer; and
ii. a second layer comprising 9.0 wt % to 40.0 wt % polymethylpentene based on the weight of the second layer; the second layer having a composition that is not substantially the same as that of the first layer and the second layer having a thickness ≤2.0 times that of the first layer.

In yet another embodiment, the invention relates to a method for producing a microporous membrane comprising:
(a) forming a first mixture comprising a first diluent and a first polymer blend, the first polymer blend comprising ≤20.0 wt % polymethylpentene based on the weight of the first polymer blend;
(b) forming a second mixture comprising a second diluent and a second polymer blend, the second polymer blend comprising 9.0 wt % to 40.0 wt % polymethylpentene based on the weight of the second polymer blend;
(c) forming a third mixture comprising a third diluent and a third polymer blend, the third polymer blend comprising ≤20.0 wt % polymethylpentene based on the weight of the third polymer blend;
(d) producing a sheet comprising a first layer comprising the first mixture, a third layer comprising the third mixture, and a second layer comprising the second mixture, the second layer being located between the first and third layers, the first mixture having a substantially different composition from each of the first and third mixtures and the second layer having a thickness ≤2.0 times that of the first and third layers; and
(e) removing at least a portion of the first, second, and third diluents from the sheet.

In yet another embodiment, a battery comprising an anode, a cathode, an electrolyte, and at least one separator located between the anode and cathode, the separator comprising:

iii. a first layer comprising ≤20.0 wt % polymethylpentene, based on the weight of the first layer; and
iv. a second layer comprising 9.0 wt % to 40.0 wt % polymethylpentene based on the weight of the second layer;
the second layer having a composition that is not substantially the same as that of the first layer and the second layer having a thickness ≤2.0 times that of the first layer.

DETAILED DESCRIPTION OF ILLUSTRATIVE EMBODIMENTS

It has been observed that microporous membranes comprising ≥20.0 wt % polymethylpentene and ≤60.0 wt % polyethylene (based on the weight of the membrane) have relatively high meltdown temperature and relatively low heat shrinkage, but have relatively low strength and electrolyte affinity. Microporous membranes comprising 100 wt % polyethylene or a mixture of polyethylene and polypropylene have greater strength and electrolyte affinity, but lower meltdown temperature and higher heat shrinkage.

The invention is based in part on the discovery of multilayer microporous membranes having first and second layers, wherein (i) the first layer comprises polymer (e.g., polyethylene and/or polypropylene) and ≤20.0 wt % polymethylpentene based on the weight of the first layer, (ii) the second layer comprises 9.0 wt % to 40.0 wt % polymethylpentene based on the weight of the second layer, and (iii) the first and second layers do not have substantially the same composition; the thickness of the second layer being ≤2.0 times the thickness of the first layer. It has been found that such membranes have increased strength, electrolyte affinity, and substantially similar meltdown temperature, compared to monolayer membranes comprising polymethylpentene. While not wishing to be bound by any theory or model, it is believed that when the amount of polymethylpentene in the first layer is >20.0 wt % and >40.0 wt % in the second layer, the membrane has decreased strength and electrolyte affinity. It is also believed that when the amount of polymethylpentene in the second layer is ≤9.0 wt %, the membrane has a lower meltdown temperature.

For the purpose of this description and the appended claims, the term "polymer" means a composition including a plurality of macromolecules, the macromolecules containing recurring units derived from one or more monomers. The macromolecules can have different size, molecular architecture, atomic content, etc. The term "polymer" includes macromolecules such as copolymer, terpolymer, etc. "Polyethylene" means polyolefin containing ≥50.0% (by number) recurring ethylene-derived units, preferably polyethylene homopolymer and/or polyethylene copolymer wherein at least 85% (by number) of the recurring units are ethylene units. "Polypropylene" means polyolefin containing >50.0% (by number) recurring propylene-derived units, preferably polypropylene homopolymer and/or polypropylene copolymer wherein at least 85% (by number) of the recurring units are propylene units. "Polymethylpentene" means polyolefin containing ≥50.0% (by number) recurring methylpentene-derived units, preferably polymethylpentene homopolymer and/or polymethylpentene copolymer wherein at least 85% by (number) of the recurring units are methylpentene units. A "microporous membrane" is a thin film having pores, where ≥90.0 percent (by volume) of the film's pore volume resides in pores having average diameters in the range of from 0.01 µm to 10.0 µm. With respect to membranes produced from extrudates, the machine direction ("MD") is defined as the direction in which an extrudate is produced from a die. The transverse direction ("TD") is defined as the direction perpendicular to both MD and the thickness direction of the extrudate. MD and TD can be referred to as planar directions of the membrane, where the term "planar" in this context means a direction lying substantially in the plane of the membrane when the membrane is flat.

Layer Constituents

In an embodiment, the membrane comprises first and second layers. The first layer comprises polyethylene and/or polypropylene and ≤20.0 wt % polymethylpentene, based on the weight of the first layer, and the second layer comprises 9.0 wt % to 40.0 wt % polymethylpentene based on the weight of the second layer. The thickness of the second layer is ≤2.0 times, that of the first layer, e.g., such as ≤1.5 times, such as ≤1.1 times, or ≤1.0 times. Optionally, the first and second layers are in contact in an A/B arrangement, with "A" representing the first layer and "B" representing the second layer. The membrane can further comprise additional layers (e.g., "C", "D", etc.) which are optionally porous or microporous and comprise polymer. For example, the membranes can have structures such as A/B/A, A/B/A/B, A/B/C, A/B/C/B/A, etc. The layers can be in planar contact, e.g., a planar face of a first layer in contact with a planar face of a second layer. In an embodiment, at least one of the membrane's two outer surfaces comprises the first (i.e., "A") layer. It has been observed that when the thickness of the second layer is ≤ the thickness of the first layer, the membrane has both greater strength and greater electrolyte affinity. When the membrane is a three layer membrane, the second layer's thickness is optionally ≤ (or <) each of the first and third layer's thicknesses.

Polymethylpentene

In an embodiment, the polymethylpentene ("PMP") comprises polymer or copolymer wherein at least 80.0% (by number) of the recurring units are units derived from methylpentene. The desired PMP has a melting temperature (Tm) ≥200.0° C., e.g., in the range of from 200.0° C. to 250.0° C., such as from 210.0° C. to 240.0° C., or from about 220.0° C. to about 230.0° C. It has been observed that when the membrane contains PMP having a Tm>240.0° C., and particularly >250.0° C., the membrane can exhibit a loss of mechanical strength when the membrane is exposed to a temperature >170.0° C. While not wishing to be bound by any theory or model, it is believed that this results from the difficulty in producing a uniform mixture of PMP and PE when the difference between PE Tm and PMP Tm is large. It has also been observed that when the membrane contains PMP having a Tm<200.0° C., it is more difficult to produce a membrane having a relatively high meltdown temperature. The PMP's Tm can be determined by differential scanning calorimetry methods similar to those described below for polypropylene.

In an embodiment, the PMP has a melt flow rate ("MFR") measured according to ASTM D 1238; 260° C./5.0 kg) ≤80.0 dg/min., for example from about 0.5 dg/min. to 60.0 dg/min., such as from about 1 dg/min. to about 30 dg/min, e.g., in the range of 10 dg/min to 40 dg/min. When the MFR of PMP is >80.0 dg/min., it can be more difficult to produce a membrane having a relatively high meltdown temperature. In one or more embodiments, the PMP has an Mw in the range of $1.0 \times 10^4$ to $4.0 \times 10^6$. The PMP's Mw and MWD can be determined by gel permeation chromatography methods similar to those described below for polypropylene, as exemplified in "*Macromolecules*, Vol. 38, pp. 7181-7183 (2005)".

The PMP can be produced, e.g., in a polymerization process using a Ziegler-Natta catalyst system (such as catalyst systems containing titanium or titanium and magnesium) or a "single site catalyst". In an embodiment, the PMP is produced by coordination polymerization using methylpentene-1 monomer, such as 4-methylpentene-1, or methylpentene-1 with one or more comonomers such as α-olefin. Optionally, the α-olefin is one or more of butane-1, pentene-1, 3-methylbutene-1, hexene-1, 4-methylpentene-1, heptene-1, octane-1, nonene-1, and decene-1. Cyclic comonomer(s) such as cyclopentene, 4-methylcyclopentene, norbornene, tricyclo-3-decene, etc., can also be used. In an embodiment, the comonomer is hexene-1, octene-1. In other embodiments, the comonomer has a number of carbon atoms in the range of $C_{10}$ to $C_{18}$, e.g., $C_{16}$ to $C_{18}$. The comonomer content in the PMP is generally ≤20.0 mol. %.

The PMP can be a mixture of PMPs (e.g., dry mixed or a reactor blend), to produce a mixture having a Tm≤250.0° C., e.g., ≤240.0° C.

Polyethylene

In an embodiment, the polyethylene ("PE") comprises a mixture (e.g., a dry mixture or a reactor blend) of PE, such as a mixture of two or more polyethylenes ("PE1", "PE2", "PE3", "PE4", etc., as described below). For example, the PE can include a blend of (i) a first PE (PE1) and/or a second PE (PE2) and (ii) a fourth PE (PE4). Optionally these embodiments can further include a third PE (PE3).

PE1

In an embodiment, the first PE ("PE1") is, e.g., one having an Mw<$1.0 \times 10^6$, e.g., in the range of from about $1.0 \times 10^5$ to about $0.90 \times 10^6$, a molecular weight distribution ("MWD"), defined as Mw divided by the number average molecular weight ("Mn")) in the range of from about 2.0 to about 50.0, and a terminal unsaturation amount <0.20 per $1.0 \times 10^4$ carbon atoms. Optionally, PE1 has an Mw in the range of from about $4.0 \times 10^5$ to about $6.0 \times 10^5$, and an MWD of from about 3.0 to about 10.0. Optionally, PE1 has an amount of terminal unsaturation $\leq 0.14$ per $1.0 \times 10^4$ carbon atoms, or 0.12 per $1.0 \times 10^4$ carbon atoms, e.g., in the range of 0.05 to 0.14 per $1.0 \times 10^4$ carbon atoms (e.g., below the detection limit of the measurement). PE1 can be, e.g., SUNFINE® SH-800 or SH-810 high density PE, available from Asahi Kasei Chemicals Corporation.

PE2

In an embodiment, the second PE ("PE2") can be, e.g., PE having an $Mw<1.0 \times 10^6$, e.g., in the range of from about $2.0 \times 10^5$ to about $0.9 \times 10^6$, an MWD in the range of from about 2 to about 50, and a terminal unsaturation amount $\geq 0.20$ per $1.0 \times 10^4$ carbon atoms. Optionally, PE2 has an amount of terminal unsaturation $\geq 0.30$ per $1.0 \times 10^4$ carbon atoms, or $\geq 0.50$ per $1.0 \times 10^4$ carbon atoms, e.g., in the range of about 0.6 to about 10.0 per $1.0 \times 10^4$ carbon atoms. A non-limiting example of PE2 is one having an Mw in the range of from about $3.0 \times 10^5$ to about $8.0 \times 10^5$, for example about $7.5 \times 10^5$, and an MWD of from about 4 to about 15. PE2 can be, e.g., Lupolen®, available from Basell.

PE1 and/or PE2 can be, e.g., an ethylene homopolymer or an ethylene/α-olefin copolymer containing $\leq 5.0$ mole % of one or more comonomer such as α-olefin, based on 100% by mole of the copolymer. Optionally, the α-olefin is one or more of propylene, butene-1, pentene-1, hexene-1, 4-methylpentene-1, octene-1, vinyl acetate, methyl methacrylate, or styrene. Such a PE can have a melting point $\geq 132°$ C. PE1 can be produced, e.g., in a process using a Ziegler-Natta or single-site polymerization catalyst, but this is not required. The amount of terminal unsaturation can be measured in accordance with the procedures described in PCT Patent Publication No. WO 97/23554, for example. PE2 can be produced using a chromium-containing catalyst, for example.

PE3

In an embodiment, PE3 can be, e.g., PE having a $Tm \leq 130.0°$ C. Using PE3 having a $Tm \leq 130.0°$ C. can provide the finished membrane with a desirably low shutdown temperature, e.g., a shutdown temperature $\leq 130.5°$ C.

Optionally, PE3 has a $Tm \geq 85.0°$ C., e.g., in the range of from $105.0°$ C. to $130.0°$ C., such as $115.0°$ C. to $126.0°$ C. Optionally, the PE3 has an $Mw \leq 5.0 \times 10^5$, e.g., in the range of from $1.0 \times 10^3$ to $4.0 \times 10^5$, such as in the range of from $1.5 \times 10^3$ to about $3.0 \times 10^5$. Optionally, the PE3 has an MWD in the range of from 2.0 to 5.0, e.g., 1.8 to 3.5. Optionally, PE3 has a mass density in the range of 0.905 g/cm³ to 0.935 g/cm³. Polyethylene mass density is determined in accordance with ASTM D1505.

In an embodiment, PE3 is a copolymer of ethylene and $\leq 5.0$ mol. % of a comonomer such as one or more of propylene, butene-1, pentene-1, hexene-1, 4-methylpentene-1, octene-1, vinyl acetate, methyl methacrylate, styrene, or other monomer. Optionally, the comonomer amount is in the range of 1.0 mol. % to 5.0 mol. %. In an embodiment, the comonomer is hexene-1 and/or octene-1.

PE3 can be produced in any convenient process, such as those using a Ziegler-Natta or single-site polymerization catalyst. Optionally, PE3 is one or more of a low density polyethylene ("LDPE"), a medium density polyethylene, a branched LDPE, or a linear low density polyethylene, such as a polyethylene produced by metallocene catalyst. PE3 can be produced according to the methods disclosed in U.S. Pat. No. 5,084,534 (such as the methods disclosed therein in examples 27 and 41), which is incorporated by reference herein in its entirety.

PE4

In an embodiment, the fourth PE ("PE4") can be, e.g., one having an $Mw \geq 1.0 \times 10^6$, e.g., in the range of from about $1.0 \times 10^6$ to about $5.0 \times 10^6$ and an MWD of from about 1.2 to about 50.0. A non-limiting example of PE4 is one having an Mw of from about $1.0 \times 10^6$ to about $3.0 \times 10^6$, for example about $2.0 \times 10^6$, and an MWD of from about 2.0 to about 20.0, preferably about 4.0 to about 15.0. PE4 can be, e.g., an ethylene homopolymer or an ethylene/α-olefin copolymer containing $\leq 5.0$ mole % of one or more comonomers such as α-olefin, based on 100% by mole of the copolymer. The comonomer can be, for example, one or more of, propylene, butene-1, pentene-1, hexene-1, 4-methylpentene-1, octene-1, vinyl acetate, methyl methacrylate, or styrene. Such a polymer or copolymer can be produced using a Ziegler-Natta or a single-site catalyst, though this is not required. Such a PE can have a melting point $\geq 134°$ C. PE4 can be ultra-high molecular weight polyethylene ("UHMWPE"), e.g., HI-ZEX MILLION® 240-m polyethylene, available from Mitsui Chemicals, Inc.

The melting points of PE1-PE4 can be determined using the methods disclosed in PCT Patent Publication No. WO 2008/140835, for example.

Polypropylene

In an embodiment, the polypropylene ("PP") can be, e.g., PP having an $Mw \geq 6.0 \times 10^5$, such as $\geq 7.5 \times 10^5$, for example in the range of from about $0.80 \times 10^6$ to about $2.0 \times 10^6$, such as in the range of about $0.90 \times 10^6$ to about $3.0 \times 10^6$. Optionally, the PP has a $Tm \geq 160.0°$ C. and a heat of fusion ("ΔHm") $\geq 90.0$ J/g, e.g., $\geq 100.0$ J/g, such as in the range of from 110 J/g to 120 J/g. Optionally, the PP has an $MWD \leq 20.0$, e.g., in the range of from about 1.5 to about 10.0, such as in the range of from about 2.0 to about 8.5 or in the range of from 2.5 to 6.0. Optionally, the PP is a copolymer (random or block) of propylene and $\leq 5.0$ mol. % of a comonomer, the comonomer being, e.g., one or more α-olefins such as ethylene, butene-1, pentene-1, hexene-1, 4-methylpentene-1, octene-1, vinyl acetate, methyl methacrylate, and styrene, etc.; or diolefins such as butadiene, 1,5-hexadiene, 1,7-octadiene, 1,9-decadiene, etc.

In an embodiment the PP is isotactic polypropylene. The term "isotactic polypropylene" means PP having a meso pentad fraction $\geq$ about 50.0 mol. % mmmm pentads, optionally $\geq$ about 94.0 mol. % mmmm pentads, or preferably $\geq 96.0$ mol. % mmmm pentads (based on the total number of pentads of isotactic PP). In an embodiment, the PP has (a) a meso pentad fraction $\geq$ about 90.0 mol. % mmmm pentads, preferably $\geq 94.0$ mol. % mmmm pentads; and (b) has an amount of stereo defects $\leq$ about 50.0 per $1.0 \times 10^4$ carbon atoms, e.g., $\leq$ about 20 per $1.0 \times 10^4$ carbon atoms, or $\leq$ about 10.0 per $1.0 \times 10^4$ carbon atoms, such as $\leq$ about 5.0 per $1.0 \times 10^4$ carbon atoms. Optionally, the PP has one or more of the following properties: (i) a $Tm \geq 162.0°$ C.; (ii) an elongational viscosity $\geq$ about $5.0 \times 10^4$ Pa sec at a temperature of $230°$ C. and a strain rate of 25 sec$^{-1}$; (iii) a Trouton's $\geq$ ratio about 15 when measured at a temperature of about $230°$ C. and a strain rate of 25 sec$^{-1}$; (iv) a Melt Flow Rate ("MFR"; ASTM D-1238-95 Condition L at $230°$ C. and 2.16 kg) $\leq$ about 0.1 dg/min, optionally $\leq$ about 0.01 dg/min (i.e., a value is low enough that the MFR is essentially not measurable); or (v) an amount extractable species (extractable by contacting the PP with boiling xylene) $\leq 0.5$ wt %, e.g., $\leq 0.2$ wt %, such as $\leq 0.1$ wt % or less based on the weight of the PP.

In an embodiment, the PP is an isotactic PP having an Mw in the range of from about $0.8 \times 10^6$ to about $3.0 \times 10^6$, optionally $0.9 \times 10^6$ to about $2.0 \times 10^6$ an $MWD \leq 8.5$, e.g., in the range of from about 2.0 to about 8.5, optionally 2.0 to 6.0, and a ΔHm≥90.0 J/g. Generally, such a PP has a meso pentad fraction ≥94.0 mol. % mmmm pentads, an amount of stereo defects ≤ about 5.0 per $1.0 \times 10^4$ carbon atoms, and a Tm≥162.0° C.

A non-limiting example of the PP, and methods for determining the PP's Tm, meso pentad fraction, tacticity, intrinsic viscosity, Trouton's ratio, stereo defects, and amount of extractable species are described in PCT Patent Publication No. WO2008/140835, which is incorporated by reference herein in its entirety.

The PP's ΔHm, is determined by the methods disclosed in PCT Patent Publication No. WO2007/132942, which is incorporated by reference herein in its entirety. Tm can be determined from differential scanning calorimetric (DSC) data obtained using a PerkinElmer Instrument, model Pyris 1 DSC. Samples weighing approximately 5.5-6.5 mg are sealed in aluminum sample pans. Starting at a temperature 30° C., Tm is measured by heating the sample to 230° C. at a rate of 10° C./minute, called first melt (no data recorded). The sample is kept at 230° C. for 10 minutes before a cooling-heating cycle is applied. The sample is then cooled from 230° C. to 25° C. at a rate of 10° C./minute, called "crystallization", then kept at 25° C. for 10 minutes, and then heated to 230° C. at a rate of 10° C./minute, called ("second melt"). For PMP Tm, a temperature of 270° C. is used instead of 230° C. The thermal events in both crystallization and second melt are recorded. The melting temperature ($T_m$) is the peak temperature of the second melting curve and the crystallization temperature ($T_c$) is the peak temperature of the crystallization peak.

Other Species

Optionally, inorganic species (such as species containing silicon and/or aluminum atoms), and/or heat-resistant polymers such as those described in PCT Publications No. WO 2007/132942 and WO 2008/016174 (both of which are incorporated by reference herein in their entirety) can be present in the first and/or second layer.

When the microporous membrane is produced by extrusion, the final microporous membrane generally comprises the polymer used to produce the extrudate. A small amount of diluent or other species introduced during processing can also be present, generally in amounts less than 1 wt % based on the weight of the membrane. A small amount of polymer molecular weight degradation might occur during processing, but this is acceptable. In a form, molecular weight degradation during processing, if any, causes the value of MWD of the polymer in the membrane to differ from the MWD of the polymer used to produce the membrane (e.g., before extrusion) by no more than, e.g., about 10%, or no more than about 1%, or no more than about 0.1%.

Mw and MWD Determination

Polymer Mw and MWD can be determined using a High Temperature Size Exclusion Chromatograph, or "SEC", (GPC PL 220, Polymer Laboratories), equipped with a differential refractive index detector (DRI). The measurement is made in accordance with the procedure disclosed in "*Macromolecules*, Vol. 34, No. 19, pp. 6812-6820 (2001)". Three PLgel Mixed-B columns (available from Polymer Laboratories) are used for the Mw and MWD determination. For PE, the nominal flow rate is 0.5 $cm^3$/min; the nominal injection volume is 300 μL; and the transfer lines, columns, and the DRI detector are contained in an oven maintained at 145° C. For PP and PMP, the nominal flow rate is 1.0 $cm^3$/min; nominal injection volume is 300 μL; and the transfer lines, columns, and the DRI detector are contained in an oven maintained at 160° C.

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. The same solvent is used as the SEC eluent. Polymer solutions are prepared by placing dry polymer in a glass container, adding the desired amount of the TCB solvent, and then heating the mixture at 160° C. with continuous agitation for about 2 hours. The concentration of polymer solution is 0.25 to 0.75 mg/ml. Sample solutions are filtered off-line before injecting to GPC with 2 μm filter using a model SP260 Sample Prep Station (available from Polymer Laboratories).

The separation efficiency of the column set is calibrated with a calibration curve generated using seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (log Mp vs. retention volume) is generated by recording the retention volume at the peak in the DRI signal for each PS standard and fitting this data set to a 2nd-order polynomial. Samples are analyzed using IGOR Pro, available from Wave Metrics, Inc.

Three-Layer Structure

Particular embodiments of the invention are directed toward microporous membranes having at least three layers: first and third layers with a second layer situated between the first and third layers. Optionally, the first and third layers have substantially the same thickness and substantially the same composition. For example, in an embodiment, (i) the first and third layers each include polyethylene and/or polypropylene and ≤20.0 wt % polymethylpentene based on the weight of the first or third layer as the case may be and (ii) the second layer includes 9.0 wt % to 40.0 wt % polymethylpentene based on the weight of the second layer. The thickness of the second layer is <50.0% of the combined thicknesses of the first, second, and third layers. While the invention will be described in terms of such a multi-layer membrane produced in a wet process, it is not limited thereto, and the description is not meant to foreclose other embodiments within the broader scope of the invention.

First and Third Layers—Amount of Polyethylene

In one or more embodiments, each of the first and third layers include ≥60.0 wt % PE, e.g., ≥80.0 wt %, such as ≥90.0 wt % based on the weight of the layer (the first or third layer as the case may be). Optionally, each of the first and third layers include PE in an amount in the range of about 60.0 wt % to about 100.0 wt %, e.g., 80.0 wt % to 99.0 wt %, such as 90.0 wt % to 98.0 wt %, based on the weight of the layer. In an embodiment, the first and third layer consist of or consist essentially of PE and have substantially the same composition.

In an embodiment, the first and third layer each include PE4, e.g., in an amount ≥5.0 wt %, e.g., ≥15.0 wt %, such as ≥25.0 wt %, based on the weight of the layer. In an embodiment, the first and third layers each include PE1 or PE2, or combined PE1 and PE2, in an amount ≥40.0 wt %, e.g., ≥50.0 wt %, such as ≥60.0 wt %, based on the weight of the layer. In an embodiment, the first and third layers each includes PE3 in an amount ≤25.0 wt %, e.g., ≤20.0 wt %, such as ≤10.0 wt %, based on the weight of the layer.

First and Third Layers—Amount of Polymethylpentene

In one or more embodiments, the first and third layers each include ≤20.0 wt % of PMP, e.g., ≤10.0 wt %, such as ≤4.0 wt % based on the weight of the layer (the first or third layer as the case may be). Optionally, the first and third layers each include PMP in an amount in the range of about 0.0 wt % to about 20.0 wt %, based on the weight of the layer, e.g., in the range of 0.5 wt % to 10.0 wt %, such as 1.0 wt % to 5.0 wt %. In an embodiment, each of the first and third layers is substantially free of PMP, e.g., the amount of PMP is ≤0.01 wt % based on the weight of the layer.

First and Third Layers—Amount of Polypropylene

Optionally, the first and/or third layer includes PP, the PP being present in an amount ≤20.0 wt %, e.g., ≤10.0 wt %, such as ≤5.0 wt %, based on the weight of the layer (the first or third layer as the case may be). When the first and/or third layer includes PP, the combined amount of PP and PMP is optionally ≤20.0 wt % based on the weight of the layer, e.g., ≤10.0 wt %, such as ≤5.0 wt %.

Second Layer—Amount of Polymethylpentene

In an embodiment, the second layer includes ≥9.0 wt % of PMP based on the weight of the second layer, e.g., ≥10.0 wt %, such as ≥15.0 wt %. For example, the second layer can contain PMP in an amount in the range of about 9.0.0 wt % to 40.0 wt %, e.g., 10.0 wt % to 35.0 wt %, such as 15.0 wt % to 30.0 wt % PMP based upon the weight of the second layer.

In an embodiment, (i) the amount of PMP in the first layer ("$PMP_1$", expressed as a weight percent based on the weight of the first layer) is substantially the same as the amount of PMP in the third layer ($PMP_3$, expressed as a weight percent based on the weight of the third layer). Optionally, (i) the amount of PMP in the second layer ("$PMP_2$", expressed as a weight percent based on the weight of the second layer) is ≥$PMP_1$ and (ii) $PMP_2$–$PMP_1$ is in the range of 0.0 wt %≤$PMP_2$–$PMP_1$≤20.0 wt %, e.g., 5.0 wt %≤$PMP_2$–$PMP_1$≤10.0 wt %. It is believed that the membranes of this embodiment are generally more resistant to delamination.

Second Layer—Amount of Polypropylene

Optionally, the second layer includes PP, the amount of PP being ≤40.0 wt % based on the weight of the second layer, e.g., ≤20.0 wt %, such as ≤10.0 wt %.

For example, the second layer can contain PP in an amount in the range of about 0.0 wt % to 40.0 wt %, e.g., 5.0 wt % to 35.0 wt %, such as 10.0 wt % to 30.0 wt % of PP based upon the weight of the second layer. In an embodiment, the second layer is substantially free of PP, e.g., the amount of PP is ≤0.01 wt % based on the weight of the second layer.

Second Layer—Amount of Polypropylene and Polymethylpentene

In embodiments where the second layer includes PP and PMP (e.g., a blend), the combined amount of PP and PMP in the second layer (expressed as a weight percent based on the weight of the second layer) is ≤65.0 wt %, e.g., ≤60.0 wt %, such as ≤50.0 wt %. It is believed that the membranes of this embodiment generally have higher strength.

Second Layer—Amount of Polyethylene

In an embodiment, the second layer includes ≥20.0 wt % PE, in other embodiments ≥30.0 wt.%, and in other embodiments ≥40.0 wt %, in other embodiments ≥55.0 wt.%, in other embodiments ≥60.0 wt % based on the weight of the second layer. For example, the second layer can include ≤91.0 wt % PE, e.g., ≤85.0 wt %, such as ≤75.0 wt % based on the weight of the second layer. In these or other embodiments, the second layer includes an amount of PE in the range of about 20.0 wt % to about 91.0 wt %, e.g., 30.0 wt % to 85.0 wt %, such as 40.0 wt % to 75.0 wt % based on the weight of the second layer. In an embodiment, the second layer contains (i) ≥5.0 wt % PE4, e.g. ≥15.0 wt % and/or (ii) ≥50.0 wt %, e.g., ≥75.0 wt % of PE1 or PE2 or a combination of PE1 and PE2, based on the weigh of the second layer.

The following membrane embodiment is representative, but the invention is not limited thereto. In this embodiment, the membrane is a multi-layer microporous membrane comprising three layers, the first and third layers being skin layers and the second layer being a core layer. The membranes of this embodiment have a thickness in the range of 20.0 μm to 30.0 μm, with the core layer having a thickness in the range of 2.5 μm to 3.0 μm. The membranes of this embodiment have a meltdown temperature ≥175° C., a normalized puncture strength in the range of 160.0 mN/μm to 200.0 mN/μm, a normalized air permeability in the range of 12 seconds/100 cm²/μm to 20.0 seconds/100 cm²/μm, and an NEA of 0.60 seconds/μm to 1.20 seconds/μm.

In this embodiment, the first layer and third layers have substantially equal thickness and composition and comprise ≥98.0 wt % PE, e.g., ≥99.0 wt % PE, such as ≥99.5 wt % PE based on the weight of the layer (the first or third layer as the case may be). Optionally, the first and third layers comprise 75.0 wt % to 85.0 wt % PE1 and 15.0 wt % to 25.0 wt % PE4 based on the weight of the layer, with PE1 having (a) an Mw in the range of from about $1.0 \times 10^5$ to about $0.90 \times 10^6$, (b) an MWD in the range of from about 3.0 to about 10.0, and (c) a terminal unsaturation amount <0.20 per $1.0 \times 10^4$ carbon atoms, and PE4 has an Mw in the range of from about $1.0 \times 10^6$ to about $5.0 \times 10^6$ and an MWD in the range of from about 4.0 to about 15.0. In this embodiment, the second layer comprises 9.0 wt % to 15.0 wt % PMP, 21.0 wt % to 35.0 wt % PP, 25.0 wt % to 35.0 wt % PE1, and 25.0 wt % to 35.0 wt % of PE4, the weight percents being based on the weight of the layers, with the PMP having (a) a Tm in the range of from about 220.0° C. to about 230.0° C. and (b) an MFR in the range of from about 10.0 dg/min to about 40.0 dg/min; the PP being an isotactic PP having (a) an Mw in the range of from about $0.8 \times 10^6$ to about $2.0 \times 10^6$, (b) a Tm≥160.0° C., (c) a heat of fusion ("ΔHm")≥90.0 J/g, and (d) an MWD in the range of from about 2.5 to about 6.0; and PE1 and PE4 being substantially the same as those of the first and third layers.

Methods for Producing the Membrane

The production of the microporous membrane is described in terms of the wet process, though the invention is not limited thereto, and this description is not meant to foreclose other embodiments within the broader scope of the invention.

In an embodiment, the multi-layer microporous membrane has at least three layers. In an embodiment, the membrane is a three-layer membrane having first and third layers comprising a first layer material and a second layer comprising a second layer material, the second layer being located between and in layer-to-layer contact with the first and third layers. The first layer material (e.g., a first polymer blend) generally comprises the same polymers (in the same relative amounts) as are specified in the preceding description of the membrane's first layer or first and third layers. Likewise, the second layer material (e.g., a second polymer blend) generally comprises the same polymers (in the same relative amounts) as are specified in the preceding description of the membrane's second layer.

The process for producing the membrane involves removing diluent from a multi-layer extrudate. The first and third layers of the extrudate comprise the first layer material and at least a first diluent and the second layer of the extrudate comprises the second layer material and at least a second diluent. The first and third layers can be outer layers of the extrudate, also called skin layers. Those skilled in the art will appreciate that the third layer of the extrudate could be produced from a different layer material, e.g., the third layer material, and could have a different thickness than the first layer. After extrusion, at least a portion of the first and second diluents are removed from the extrudate. The process can further comprise stretching the extrudate in MD and/or TD. The stretching can be conducted before and/or after diluent removal. An embodiment for producing a three-layer membrane will now be described in more detail.

The First Mixture

A first mixture is produced by combining the first layer material (which has optionally been dry-mixed or melt-blended, or is, e.g., in the form of a reactor blend) and a first diluent. The first diluent (which can be a combination of diluents) can be, e.g., a solvent for the polymers of the first layer material. The first mixture can optionally contain additives such as one or more antioxidants. In an embodiment, the amount of such additives does not exceed 1.0 wt % based on the weight of the mixture of polymer and diluent.

The diluent can comprise species capable of forming a single phase in conjunction with the first layer material at the extrusion temperature. For example, the first diluent can be a solvent for the polymers of the first layer material. Representative diluents include aliphatic or cyclic hydrocarbon such as nonane, decane, decalin and paraffin oil; and phthalic acid ester such as dibutyl phthalate and dioctyl phthalate. Paraffin oil with kinetic viscosity of 20-200 cSt at 40° C. can be used. The choice of first diluent, mixing condition, extrusion condition, etc. can be the same as those disclosed in PCT Patent Publication No. WO 2008/016174, for example, which is incorporated by reference herein in its entirety.

The amount of first diluent in the first mixture is not critical. In an embodiment, the amount of first diluent is in the range of about 50 wt % to about 85 wt %, e.g., 60 wt % to 80 wt %, based on the combined weight of the first mixture. The temperature to which the first mixture is exposed during mixing should be sufficiently high to produce a single-phase mixture for extrusion, e.g., a temperature ≥210.0° C., e.g., ≥220.0° C., such as ≥230.0° C. or even ≥240.0° C., but not exceeding the temperature at which the diluent or polymer would experience significant molecular weight degradation, for example.

The Second Mixture

The second mixture is produced from the second layer material and the second diluent. The second mixture can be produced by the same methods used to produce the first mixture, but does not have substantially the same composition as the first (or third) mixture. The second diluent can be selected from among the same diluents as the first diluent. And while the second diluent can be (and generally is) selected independently of the first diluent, the diluent can be the same as the first diluent, and can be used in the same relative concentration as the first diluent is used in the first mixture. The temperature to which the second mixture is exposed during mixing should be sufficiently high to produce a single-phase mixture for extrusion, e.g., a temperature ≥210.0° C., e.g., ≥220.0° C., such as ≥230.0° C. or even ≥240.0° C., but not exceeding the temperature at which the diluent or polymer would experience, significant molecular weight degradation, for example.

Extrusion

In an embodiment, the first mixture is conducted from a first extruder to first and third dies and the second mixture is conducted from a second extruder to a second die. A layered extrudate in sheet form (i.e., a body significantly larger in the planar directions than in the thickness direction) can be extruded from the first, second, and third dies to produce a multi-layer extrudate having a first skin layer comprising the first mixture, a second skin layer comprising a third mixture, and a core layer comprising the second mixture, wherein the third mixture can be substantially the same as the first mixture. The thickness of the second layer is ≤2.0 times the thickness of each of the first and third layers, e.g., ≤1.5 times, such as ≤1.1 times, or ≤1.0 time.

The choice of die or dies and extrusion conditions can be the same as those disclosed in PCT Patent Publication No. WO 2008/016174, for example. The temperature to which the first and second mixtures are exposed within the die should be sufficiently high so as to maintain each of the first and second mixtures as a single phases (e.g., in the molten state) during extrusion, e.g., a temperature ≥210.0° C., ≥220.0° C., such as ≥230.0° C. or even ≥240.0° C., but not exceeding the temperature at which the diluent or polymer would experience significant molecular weight degradation, for example. Matching the viscosities of the first and second mixture is believed to be beneficial for lessening the amount of thickness variation in the finished membrane. This can be accomplished by, e.g., one or more of (i) maintaining the core layer PMP content (in weight percent, based on the weight of polymer in the layer) within about 20.0% of the skin layer PMP content (in weight percent, based on the weight of polymer in the layer); (ii) regulating the extrusion and die temperatures; or (iii) regulating the amount of diluent in at least one the polymer-diluent mixtures.

Extrudate Cooling (Optional)

Optionally, the multi-layer extrudate is exposed to a temperature in the range of 15° C. to 50° C. to form a cooled extrudate. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Patent Publication No. WO 2008/01617, for example. In an embodiment, the cooled extrudate has a thickness ≤10 mm, e.g., in the range of 0.1 mm to 10 mm, or 0.5 mm to 5 mm. Generally, the second layer of the cooled extrudate has a thickness that is ≤50% of the cooled extrudate's total thickness; and the first and third layers of the cooled extrudate optionally having substantially the same thickness.

Stretching the Extrudate (Upstream Stretching)

The extrudate or cooled extrudate can be stretched in at least one direction (called "upstream stretching" or "wet stretching"), e.g., in a planar direction such as MD or TD. It is believed that such stretching results in at least some orientation of the polymer in the extrudate. This orientation is referred to as "upstream" orientation. The extrudate can be stretched by, for example, a tenter method, a roll method, an inflation method or a combination thereof, as described in PCT Patent Publication No. WO 2008/016174, for example. The stretching may be conducted monoaxially or biaxially; in certain embodiments, the extrudate is biaxially stretched. In the case of biaxial stretching, any of simultaneous biaxial stretching, sequential stretching or multi-stage stretching (for instance, a combination of the simultaneous biaxial stretching and the sequential stretching) can be used; in certain embodiments, the extrudate is simultaneously biaxially stretched. When biaxial stretching is used, the magnification factor need not be the same in each stretching direction.

Optionally, the extrudate is stretched simultaneously in TD and MD to a magnification factor in the range of 4 to 6. Suitable stretching methods are described in PCT Patent Publication No. WO 2008/016174, for example. While not required, the MD and TD magnifications can be the same. In an embodiment, the stretching magnification is equal to 5 in MD and TD. The magnification factor operates multiplicatively on film size. For example, a film having an initial width (TD) of 2.0 cm that is stretched in TD to a magnification factor of 4 fold will have a final width of 8.0 cm.

While not required, the stretching can be conducted while exposing the extrudate to a temperature in the range of from about Tcd to Tm, where Tcd and Tm are defined as the crystal dispersion temperature and melting point of the PE having the lowest melting point among the polyethylenes used to produce the extrudate. The crystal dispersion temperature is determined by measuring the temperature characteristics of dynamic viscoelasticity according to ASTM D 4065. In an embodiment where Tcd is in the range of about 90 to about 100° C., the stretching temperature can be from about 90° C. to about 125° C.; preferably from about 100° C. to about 125° C., more preferably from 105° C. to 125° C.

Optionally, the stretched extrudate can undergo a thermal treatment before diluent removal. In the thermal treatment, the stretched extrudate is exposed to a temperature that is higher (warmer) than the temperature to which the extrudate is exposed during stretching. The planar dimensions of the stretched extrudate (length in MD and width in TD) can be held constant while the stretched extrudate is exposed to the higher temperature. Since the extrudate contains polymer and diluent, its length and width are referred to as the "wet" length and "wet" width. In an embodiment, the stretched extrudate is exposed to a temperature in the range of 110° C. to 125° C. for a time in the range of 1 second to 100 seconds while the wet length and wet width are held constant, e.g., by using tenter clips to hold the stretched extrudate along its perimeter. In other words, during the thermal treatment, there is no magnification or demagnification (i.e., no dimensional change) of the stretched extrudate in MD or TD.

In this step and in other steps such as downstream stretching and heat setting where the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infrared heating in an oven, etc. can be used with or instead of heated air.

Diluent Removal

In an embodiment, at least a portion of the first and second diluents are removed (or displaced) from the extrudate to form a membrane. A displacing (or "washing") solvent can be used to remove (wash away or displace) the first and second diluents. Process conditions for removing first and second diluents can be the same as those disclosed in PCT Patent Publication No. WO 2008/016174, for example. The term "dried membrane" refers to an extrudate from which at least a portion of the diluent has been removed. It is not necessary to remove all diluent from the extrudate, although it can be desirable to do so since removing diluent increases the porosity of the final membrane.

In an embodiment, at least a portion of any remaining volatile species, such as washing solvent, can be removed from the dried membrane at any time after diluent removal. Any method capable of removing the washing solvent can be used, including conventional methods such as heat-drying, wind-drying (moving air), etc. Process conditions for removing volatile species, such as washing solvent, can be the same as those disclosed in PCT Patent Publications No. WO 2008/016174 and WO 2007/132942, for example.

Stretching the Membrane (Downstream Stretching)

The dried membrane can be stretched (called "downstream stretching" or "dry stretching" since at least a portion of the diluent has been removed or displaced) in at least one direction, e.g., MD and/or TD. It is believed that such stretching results in at least some orientation of the polymer in the membrane. This orientation is referred to as downstream orientation. Before downstream stretching, the dried membrane has an initial size in MD (a first dry length) and an initial size in TD (a first dry width). As used herein, the term "first dry width" refers to the size of the dried membrane in TD prior to the start of dry stretching. The term "first dry length" refers to the size of the dried membrane in MD prior to the start of dry stretching. Tenter stretching equipment of the kind described in WO 2008/016174 can be used, for example.

The downstream stretching can be conducted in MD, TD, or both directions. The membrane can be stretched in MD from the first dry length to a second dry length that is larger than the first dry length by a magnification factor (the "MD dry stretching magnification factor") in the range of from about 1.1 to about 1.5. When TD dry stretching is used, the dried membrane can be stretched in TD from the first dry width to a second dry width that is larger than the first dry width by a magnification factor (the "TD dry stretching magnification factor"). The TD dry stretching magnification factor can be in the range of from about 1.1 to about 1.6. When the stretching is conducted in both MD and TD, it can be sequential or simultaneous. Since TD heat shrinkage generally has a greater effect on battery properties than does MD heat shrinkage, the amount of TD dry magnification generally does not exceed the amount of MD dry magnification. When biaxial dry stretching is used, the dry stretching can be simultaneous in MD and TD or sequential. When the dry stretching is sequential, generally MD stretching is conducted first followed by TD stretching. When (i) the second layer's PE4 content is less than 5.0 wt %, (ii) the second layer's PMP content is ≥30.0 wt %, and (iii) the thickness of the second layer is ≥45% of the combined thickness of the first second and third layers; downstream orientation to a magnification factor ≥1.2 may be needed to produce a membrane having a normalized pin puncture strength ≥1.2×10$^2$ mN/μm and a normalized air permeability ≤40.0 seconds/100 cm$^3$/μm.

The downstream orientation is generally conducted while exposing the dried membrane to a temperature ≤Tm, e.g., in the range of from about Tcd−30° C. to Tm. In an embodiment, the stretching temperature is generally conducted with the membrane exposed to a temperature in the range of from about 70 to about 135° C., for example from about 120° C. to about 132° C., or from about 122° C. to about 130° C.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second. Though not critical, the upper limit of the stretching rate is preferably 50%/second to prevent rupture of the membrane.

Controlled Width Reduction (Optional)

Following downstream stretching, the dried membrane can be subjected to a controlled reduction in width from the second dry width to a third width, the third dry width being in the range of from the first dry width to about 1.4 times larger than the first dry width. The width reduction generally conducted while the membrane is exposed to a temperature ≥Tcd−30° C., but less than Tm. For example, the membrane can be exposed to a temperature in the range of from about 70° C. to about 135° C., such as from about 120° C. to about 132° C., or from about 125° C. to about 130° C. In an embodiment, the decreasing of the membrane's width is conducted while the membrane is exposed to a temperature that is lower than Tm. In an embodiment, the third dry width is in the range of from about 1.1 times larger than the first dry width to about 1.4 times larger than the first dry width.

It is believed that exposing the membrane to a temperature during the controlled width reduction that is ≥ the temperature to which the membrane was exposed during the TD stretching leads to greater resistance to heat shrinkage in the finished membrane.

Heat-Setting (Optional)

Optionally, the membrane is thermally treated (heat-set) one or more times after diluent removal, e.g., after downstream stretching, the controlled width reduction, or both. It is believed that heat-setting stabilizes crystals and makes uniform lamellas in the membrane. In an embodiment, the heat setting is conducted while exposing the membrane to a temperature in the range Tcd to Tm, e.g., a temperature, e.g., in the range of from about 100° C. to about 135° C., such as from about 120° C. to about 132° C., or from about 122° C. to about 130° C. Generally, the heat setting is conducted for a time sufficient to form uniform lamellas in the membrane, e.g., ≤1,000 seconds, such as a time in the range of 1 to 600 seconds. In an embodiment, the heat setting is operated under conventional heat-set "thermal fixation" conditions. The term "thermal fixation" refers to heat-setting carried out while maintaining the length and width of the membrane substantially constant, e.g., by holding the membrane's perimeter using tenter clips during the heat setting.

Optional annealing, heated roller, hot solvent, cross linking, hydrophilizing, and coating treatments can be conducted if desired, e.g., as described in PCT Patent Publication No. WO 2008/016174.

Membrane Structure and Properties

In an embodiment, the membrane is a dimensionally-stable (e.g., resistant to delamination) microporous membrane having at least two layers, where the respective layers have a composition derived from the polymers described above.

The membrane generally comprises the polymer used to produce the extrudate. A small amount of diluent or other species introduced during processing can also be present, generally in amounts ≤1.0 wt % based on the weight of the membrane. A small amount of polymer molecular weight degradation might occur during processing, but this is acceptable. In an embodiment, the Mw of the polymers in the membrane decrease by a factor of ≤10%, for example, or ≤1.0%, or ≤0.1% with respect to the Mw of the polymers used to produce the membrane.

The membrane optionally has one or more of the following properties.

Thickness

In one or more embodiments, the microporous membrane includes a first layer having a thickness $T_1$, a second layer having a thickness $T_2$, and a third layer having a thickness $T_3$, with the second layer being located between the first and third layers. In an embodiment, $T_2 \leq T_1 + T_3$. In an embodiment, $T_1 \geq 0.8$ times $T_3$, e.g., $T_1 \geq 0.9$ times $T_3$, such as $T_1 = T_3$. For example, in an embodiment, (i) $T_1$ is substantially the same as $T_3$ and (ii) $T_2$ is ≤50.0% of the sum of $T_1 + T_2 T_3$, e.g., in the rage of 5.% to 33.3% of the sum of $T_1 + T_2 + T_3$, e.g., 10.0% to 30.0% of the sum of $T_1 + T_2 + T_3$, such as 12.0% to 25.0% of the sum of $T_1 + T_2 + T_3$. Optionally, $T_1$ is substantially the same as $T_3$ and $T_2 \leq T_1$.

In an embodiment, $T_1$, $T_2$, and $T_3$ are each ≥1.5 µm, e.g., ≥5.0 µm, such as ≥10.0 µm. For example, in one embodiment (i) $T_1$ is substantially the same as $T_3$, (ii) $T_1$ is in the range of 8.0 µm to 30 µm, (iii) $T_2$ is in the range of 1.5 µm to 10.0 µm, and $T_3$ is in range of 8.0 µm to 30 µm.

In an embodiment, the membrane is a multi-layer microporous membrane. The membrane's thickness is generally ≥10.0 µm, e.g., 20.0 µm, such as in the range of from about 10.0 µm to about $2.0 \times 10^2$ µm, e.g., from about 10.0 µm to about 30.0 µm. Optionally, the second layer has a thickness in the range of from 12.0% to 25.0% of the membrane's total thickness; and the thicknesses of the first and third layers are each in the range of 37.5% to 44% of the membrane's total thickness. The membrane's thickness can be measured, e.g., by a contact thickness meter at 1.0 cm longitudinal intervals over the width of 10.0 cm, and then averaged to yield the membrane thickness. Thickness meters such as the Litematic available from Mitsutoyo Corporation are suitable. Non-contact thickness measurement methods are also suitable, e.g., optical thickness measurement methods.

Porosity

The membrane's porosity is measured conventionally by comparing the membrane's actual weight to the weight of an equivalent non-porous membrane of 100% polymer (equivalent in the sense of having the same polymer composition, length, width, and thickness). Porosity is then determined using the formula: Porosity %=100× (w2−w1)/w2, where "w1" is the actual weight of the membrane, and "w2" is the weight of an equivalent non-porous membrane (of the same polymers) having the same size and thickness. Optionally, the membrane's porosity is ≥20%, e.g., in the range of 25.0% to 85.0%, such as in the range of 35.0 to 60.0%.

Normalized Air Permeability

In an embodiment, the membrane has a normalized air permeability ≤40.0 seconds/100 cm³/µm (as measured according to JIS P8117), e.g., ≤30.0 seconds/100 cm³/µm, such as ≤20.0 seconds/100 cm³/µm. Since the air permeability value is normalized to the air permeability value of an equivalent membrane having a film thickness of 1.0 µm, the membrane's air permeability value is expressed in units of "seconds/100 cm³/µm". Optionally, the membrane's normalized air permeability is in the range of from about 1.0 seconds/100 cm³/µm to about 30.0 seconds/100 cm³/µm, or from about 5.0 seconds/100 cm³/µm to about 20.0 seconds/100 cm³/µm. Normalized air permeability is measured according to JIS P8117, and the results are normalized to the permeability value of an equivalent membrane having a thickness of 1.0 µm using the equation $A = 1.0 \mu m*(X)/T_1$, where X is the measured air permeability of a membrane having an actual thickness $T_1$ and A is the normalized air permeability of an equivalent membrane having a thickness of 1.0 µm.

Normalized Pin Puncture Strength

The membrane's pin puncture strength is expressed as the pin puncture strength of an equivalent membrane having a thickness of 1.0 µm [mN/µm]. Pin puncture strength is defined as the maximum load measured at 23° C. when the membrane having a thickness of $T_1$ is pricked with a needle of 1 mm in diameter with a spherical end surface (radius R of curvature: 0.5 mm) at a speed of 2 mm/second. The pin puncture strength ("S") is normalized to the pin puncture strength value of an equivalent membrane having a thickness of 1.0 µm using the equation $S = [1.0 \mu m*(S_1)]/(T_1)$, where $S_1$ is a pin puncture strength "as measured" and $T_1$ is the average thickness of the membrane. Optionally, the membrane's normalized pin puncture strength is $\geq 1.2 \times 10^2$ mN/µm, e.g., $\geq 1.4 \times 10^2$ mN/µm, such as $\geq 1.6 \times 10^2$ mN/µm. In an embodiment, the membrane has a normalized pin puncture strength in the range of about $1.1 \times 10^2$ mN/µm to about $2.5 \times 10^2$ mN/µm.

Shutdown Temperature

The microporous membrane's shutdown temperature is measured by the method disclosed in PCT Patent Publication No. WO 2007/052663, which is incorporated by reference herein in its entirety. According to this method, the microporous membrane is exposed to an increasing temperature (5° C./minute beginning at 30° C.) while measuring the membrane's air permeability. The microporous membrane's shutdown temperature is defined as the temperature at which the microporous membrane's air permeability (Gurley Value) first exceeds $1.0\times10^5$ seconds/100 cm$^3$. For the purpose of measuring membrane meltdown temperature and shutdown temperature, air permeability can be measured according to JIS P8117 using, e.g., an air permeability meter (EGO-1T available from Asahi Seiko Co., Ltd.). In an embodiment, the membrane has a shutdown temperature ≤140.0° C., e.g., in the range of about 120.0° C. to about 140.0° C., such as in the range of from 130.0° C. to 138.0° C.

Meltdown Temperature (as Measured by Membrane Rupture)

Meltdown temperature is measured as follows. A sample of the microporous membrane measuring 5 cm×5 cm is fastened along its perimeter by sandwiching the sample between metallic blocks each having a circular opening of 12 mm in diameter. The blocks are then positioned so the plane of the membrane is horizontal. A tungsten carbide ball of 10 mm in diameter is placed on the microporous membrane in the circular opening of the upper block. Starting at 30° C., the membrane is then exposed to an increasing temperature at a rate of 5° C./minute. The membrane's meltdown temperature is defined as the temperature at which the ball completely penetrates the sample, i.e., the temperature at which the sample breaks. In an embodiment, the membrane can have a meltdown temperature ≥170.0° C., e.g., ≥180.0° C., such as ≥200.0° C. In an embodiment, the membrane has a meltdown temperature in the range of about 175.0° C. to about 210.0° C., e.g., in the range of from 180.0° C. to 205.0° C.

Normalized Electrolyte Affinity

A 50 mm×50 mm membrane sample is prepared and laid flat on a glass substrate having a larger area than that of the film. The film is illuminated from above using visible light, and is opaque (not transparent) at the start of the measurement. A 500.0 µl droplet of a mixture of (i) 97.0 wt % propylene carbonate 99 vol % purity) and (ii) 3.0 wt % dimethylcarbonate (the weight percents being based on the weight of the mixture) is applied to the surface of the film while exposing the membrane to a temperature of 25° C., +/−3° C. The membrane's electrolyte affinity ("EA") is defined as the average elapsed time from the droplet's initial contact with the film to the time when the film becomes transparent. The measurement is repeated five times to obtain the average value.

Normalized Electrolyte Affinity ("NEA") is defined as EA/ (average membrane thickness in µm). NEA has the units of [seconds/µm]. In an embodiment, the membrane has an NEA≤4.0 seconds/µm, such as ≤2.0 seconds/µm, e.g., in the range of 0.1 seconds/µm to 1.5 seconds/µm.

Heat Shrinkage at 105° C. in at Least One Planar Direction

The membrane's shrinkage at 105° C. in MD and TD is measured as follows: (i) measure the size of a test piece of microporous membrane at ambient temperature in both the MD and TD, (ii) equilibrate the test piece of the microporous membrane at a temperature of 105.0° C. for 8 hours with no applied load, and then (iii) measure the size of the membrane in both the MD and TD. The heat (or "thermal") shrinkage in MD and TD can be obtained by dividing the result of measurement (i) by the result of measurement and (ii) expressing the resulting quotient as a percent.

Optionally, the membrane has a heat shrinkage at 105° C. in at least one planar direction (e.g., MD or TD) of ≤10.0% e.g., ≤5.0%, such as in the range of from 0.10% to 5.0%, e.g., 0.20% to 1.0%.

TD Heat Shrinkage at 130° C.≤25.0% and TD Heat Shrinkage at 170° C.≤55.0%

In an embodiment, the membrane has a TD heat shrinkage at 130° C.≤25.0%, for example in the range of from about 1.0% to about 25.0%, and/or a TD heat shrinkage at 170° C.≤50.0%, e.g., from about 1.0% to about 50.0%.

The measurement of 130° C. and 170° C. heat shrinkage is slightly different from the measurement of heat shrinkage at 105° C., reflecting the fact that the edges of the membrane parallel to the transverse direction are generally fixed within the battery, with a limited degree of freedom allowed for expansion or contraction (shrinkage) in TD, particularly near the center of the edges parallel to MD. Accordingly, a square sample of microporous film measuring 50 mm along TD and 50 mm along MD is mounted in a frame at 23.0° C., with the edges parallel to TD fixed to the frame (e.g., by tape) leaving a clear aperture of 35 mm in MD and 50 mm in TD. The frame with sample attached is then exposed to a temperature of 130° C. or 170° C. for thirty minutes, and then cooled. TD heat shrinkage generally causes the edges of the film parallel to MD to bow slightly inward (toward the center of the frame's aperture). The shrinkage in TD (expressed as a percent) is equal to the length of the sample in TD before heating divided by the narrowest length (within the frame) of the sample in TD after heating times 100 percent.

Battery Separator Film and Battery

The membrane is permeable to liquid (aqueous and non-aqueous) at atmospheric pressure. Thus, the membrane can be used as a battery separator, filtration membrane, etc. The thermoplastic film is particularly useful as a BSF for a secondary battery, such as a nickel-hydrogen battery, nickel-cadmium battery, nickel-zinc battery, silver-zinc battery, lithium-ion battery, lithium-ion polymer battery, etc. In an embodiment, the invention relates to lithium-ion secondary batteries containing BSF comprising the thermoplastic film. Such batteries are described in PCT Patent Publication No. WO 2008/016174, which is incorporated herein by reference in its entirety. Such batteries can be used as a power source, e.g., for electric vehicles and hybrid electric vehicles.

The present invention will be explained in more detail referring to the following non-limiting examples.

Example 1

(1) Preparation of the First Mixture

A first mixture is prepared as follows. First, combine 82.0 wt % of PE having an Mw of $5.6\times10^5$ and a Tm of 134.0° C. (the PE1), and 18.0 wt % of PE having a Mw of $1.9\times10^6$ and a Tm of 136.0° C. (the PE4), the weight percents being based on the weight of the combined polymer.

Next, 25.0 wt % of the combined polymer is charged into a strong-blending double-screw extruder having an inner diameter of 58 mm and L/D of 42, and 75.0 wt % liquid paraffin (50 cst at 40° C.) is supplied to the double-screw extruder via a side feeder. Mixing is conducted at 220° C. and 200 rpm to produce the first mixture, the weight percents being based on the weight of the first mixture.

(2) Preparation of the Second Mixture

A second mixture is prepared in the same manner as the first except as follows. The combined polymer includes (a) 10.0 wt % of polymethylpentene having an MFR of 21 dg/min and a Tm of 222.0° C. (Mitsui Chemicals, Inc. TPX: MX002) (the PMP), (b) 30.0 wt % of isotactic polypropylene having an Mw of $1.1\times10^6$ and a Tm of 163.8° C. (the PP), (c) 58.6 wt % of the PE1, and (d) 1.4 wt % of the PE4, the weight percents being based on the weight of the combined polymer. 30.0 wt % of the combined polymer is charged into the strong-blending double-screw extruder and 70.0 wt % of the liquid paraffin is supplied to the side feeder. Mixing is conducted at 220° C. and 400 rpm to produce the second mixture.

(3) Membrane Production

The first and second mixtures are supplied from their respective double-screw extruders to a three-layer-extruding T-die, and extruded therefrom to form a layered extrudate of first mixture/second mixture/first mixture at a layer thickness ratio of 43/14/43. The extrudate is cooled while passing through cooling rollers controlled at 20° C., to form a three-layer gel-like sheet, which is simultaneously biaxially stretched (upstream stretching) at 113° C. to a magnification of 5 fold in both MD and TD by a tenter-stretching machine. The stretched three-layer gel-like sheet is fixed to an aluminum frame of 20 cm×20 cm, immersed in a bath of methylene chloride controlled at 25° C. to remove liquid paraffin with vibration of 100 rpm for 3 minutes, and dried by air flow at room temperature. The membrane's width is then increased by a magnification factor of 1.4 (TD downstream stretching), while (i) holding the membrane's length constant and (ii) exposing the membrane to a temperature of 126° C. Following downstream stretching, the membrane is subjected to a controlled width reduction while exposing the membrane to a temperature of 126° C. to achieve a final magnification factor of 1.2 based on the width of the membrane in TD at the start of downstream stretching. While holding the size (length and width) of the membrane substantially constant, the membrane is then heat-set at 126° C. for 10 minutes to produce the final microporous membrane. Selected starting materials, process conditions, and membrane properties are set out in Table 1.

Examples 2 and 3, and Comparative Examples 1-4

Example 1 is repeated except as noted in Table 1. Starting materials and process conditions are the same as are used in Example 1, except as noted in the Table. For example, Comparative Examples 1-4 are not subjected to downstream stretching.

TABLE 1

| No. | Example 1 | Example 2 | Example 3 |
|---|---|---|---|
| First layer material | | | |
| PMP Content (wt %) | 0 | 0 | 4 |
| PP Content (wt %) | 0 | 0 | 4 |
| PE1 Content (wt %) | 82 | 82 | 74 |
| PE4 Content (wt %) | 18 | 18 | 18 |
| Amount of polymer in first mixture (wt %); balance is Liquid Paraffin | 25 | 25 | 25 |
| Second layer material | | | |
| PMP Content (wt %) | 10 | 10 | 25 |
| PP Content (wt %) | 30 | 30 | 25 |
| PE1 Content (wt %) | 58.6 | 58.6 | 20 |
| PE4 Content (wt %) | 1.4 | 1.4 | 30 |
| Amount of polymer in second mixture (wt %); balance is Liquid Paraffin | 30 | 30 | 27.5 |
| Extrudate | | | |
| Layer structure | (I)/(II)/(I) | (I)/(II)/(I) | (I)/(II)/(I) |
| Layer thickness ratio | 43/14/43 | 40/20/40 | 32.5/35/32.5 |
| Stretching of Gel-Like sheet | | | |
| Temperature (° C.) | 113 | 113 | 115 |
| Magnification (MD × TD) | 5 × 5 | 5 × 5 | 5 × 5 |
| Stretching of dried membrane | | | |
| Temperature (° C.) | 126 | 126 | 125 |
| Magnification (TD) | 1.4 | 1.4 | 1.0 |
| Controlled Width Reduction | | | |
| Temperature (° C.) | 126 | 126 | 125 |
| Magnification (TD) | 1.2 | 1.2 | 1.0 |
| Heat setting, Temperature (° C.) | 126 | 126 | 125 |
| Average thickness (µm) | 25 | 25 | 22 |
| Normalized Air Permeability (sec/100 cm$^3$/µm) | 16.2 | 15.0 | 23 |
| Porosity % | 44 | 44 | 52 |
| Normalized Puncture Strength (mN/µm) | 227 | 220. | 102 |
| Meltdown Temperature (° C.) | 185 | 185 | 192 |
| TD Heat shrinkage at 105° C. (%) | 0.5 | 0.4 | 3.0 |
| TD Heat shrinkage at 130° C. (%) | 19 | 22 | 17 |
| TD Heat shrinkage at 170° C. (%) | 49 | 49 | 35 |
| NEA (seconds/µm) | 0.14 | 0.13 | 1.3* |

| No. | C. E. 1 | C. E. 2 | C. E. 3 | C. E. 4 |
|---|---|---|---|---|
| First layer material | | | | |
| PMP Content (wt %) | 10 | 20 | 0 | 5 |
| PP Content (wt %) | 0 | 0 | 0 | 0 |
| PE1 Content (wt %) | 72 | 62 | 82 | 77 |

TABLE 1-continued

| | | | | |
|---|---|---|---|---|
| PE4 Content (wt %) | 18 | 18 | 18 | 18 |
| Amount of polymer in first mixture (wt %); balance is Liquid Paraffin | 25 | 25 | 25 | 25 |
| Second layer material | | | | |
| PMP Content (wt %) | 40 | 40 | 25 | 25 |
| PP Content (wt %) | 0 | 0 | 0 | 0 |
| PE1 Content (wt %) | 30 | 30 | 57 | 57 |
| PE4 Content (wt %) | 30 | 30 | 18 | 18 |
| Amount of polymer in second mixture (wt %); balance is Liquid Paraffin | 25 | 25 | 25 | 25 |
| Extrudate | | | | |
| Layer structure | (1)/(11)/(1) | (1)/(11)/(1) | (1)/(11)/(1) | (1)/(11)/(1) |
| Layer thickness ratio | 15/70/15 | 15/70/15 | 17.5/65/17.5 | 17.5/65/17.5 |
| Stretching of Gel-Like sheet | | | | |
| Temperature (° C.) | 115 | 115 | 115 | 120 |
| Magnification (MD × TD) | 5 × 5 | 5 × 5 | 5 × 5 | 5 × 5 |
| Stretching of dried membrane | | | | |
| Temperature (° C.) | — | — | — | — |
| Magnification (TD) | — | — | — | — |
| Controlled Width Reduction | | | | |
| Temperature (° C.) | — | — | — | — |
| Magnification (TD) | — | — | — | — |
| Heat setting | | | | |
| Temperature (° C.) | 125 | 125 | 125 | 125 |
| Average thickness (μm) | 25 | 21 | 18 | 24 |
| Normalized Air Permeability (sec/100 cm³/μm) | 123 | 214 | 142 | 47.3 |
| Porosity % | 44 | 38 | 30 | 48 |
| Normalized Puncture Strength (mN/μm) | 107 | 148 | 188 | 105 |
| Meltdown Temperature (° C.) | 197 | 203 | 201 | 204 |
| TD Heat shrinkage at 105° C. (%) | 2.9 | 3.2 | 2.4 | 2.8 |
| TD Heat shrinkage at 130° C. (%) | 14 | 17 | 14 | 14 |
| TD Heat shrinkage at 170° C. (%) | Break | 32 | 32 | 38 |
| NEA (seconds/μm) | ≥7.5 | ≥7.5 | ≥7.5 | ≥7.5 |

*= A ratio of 90.0 wt % propylene carbonate to 10.0 wt % dimethylcarbonate is used.

Results

Examples 1, 2, and 3 demonstrate that a dimensionally-stable multi-layer membrane can be produced, the membrane having (i) a first layer comprising polyethylene and/or polypropylene and ≤20.0 wt % polymethylpentene, based on the weight of the first layer and (ii) a second layer comprising 9.0 wt % to 40.0 wt % polymethylpentene based on the weight of the second layer; the second layer having a thickness that is less than or equal to that of the first layer.

The membranes have a meltdown temperature ≥175.0° C., a normalized pin puncture strength ≥1.60×10² mN/μm, a normalized air permeability ≤40.0 seconds/100 cm³/μm, a 105° C. TD heat shrinkage ≤5.0%, and an NEA≤4.0 seconds/μm. The relatively large core layer thickness of Comparative Examples 1-4 results in lower permeability and longer NEA times, with the same or reduced strength.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all inventive features which reside herein, including all features which would be treated as equivalents thereof by those skilled in the art to which this disclosure pertains.

When numerical lower limits and numerical upper limits are listed herein, ranges from any lower limit to any upper limit are contemplated.

What is claimed is:

1. A multilayer microporous membrane comprising:
   i. a first layer comprising ≤20.0 wt % polymethylpentene, based on the weight of the first layer; <20.0 wt % polypropylene based on the weight of the first layer and further comprising ≥60.0 wt % polyethylene based on the weight of the layer, wherein the polyethylene comprises a first polyethylene having an Mw<1.0×10⁶ and a second polyethylene having an Mw≥1.0×10⁶, the polypropylene is an isotactic polypropylene having an Mw>0.8×10⁶, and the polymethylpentene has an Mw of from 1.0×10⁴ to 4.0×10⁶ and a Tm≥200° C.; and
   ii. a second layer comprising 10.0 wt % to 40.0 wt % polymethylpentene based on the weight of the second layer, 21.0 wt % to 35.0 wt % polypropylene based on the weight of the second layer, and ≥20.0 wt % polyethylene based on the weight of the second layer, wherein the polyethylene comprises a first polyethylene having an Mw<1.0×10⁶ and a second polyethylene having an Mw≥1.0×10⁶, the polypropylene is an isotactic polypropylene having an Mw>0.8×10⁶, and the polymethylpentene has an Mw of 1.0×10⁴ to 4.0×10⁶ and a Tm≥200° C.;

the second layer having a composition that is not the same as that of the first layer and the second layer having a thickness ≤2.0 times that of the first layer.

2. The membrane of claim 1, wherein the membrane has a meltdown temperature ≥175.0° C. and an NEA≤4.0 seconds.

3. The membrane of claim 1, wherein the membrane further comprises a third layer, the second layer being located between the first and third layers, wherein the total amount of polypropylene and polymethylpentene in the second layer is ≤65.0 wt % based on the weight of the second layer.

4. The membrane of claim 1, wherein (i) the first, second, and third layers have a combined thickness ≥10.0 µm, (ii), the second layer's thickness is ≤ each of the first and third layer's thicknesses, and wherein and the third layer has substantially the same composition and thickness as the first layer.

5. The membrane of claim 4, wherein the membrane has a normalized air permeability ≤30 seconds/100 cm$^3$/µm, a normalized pin puncture strength in the range of ≥1.4×10$^2$ Mn/µm, a meltdown temperature ≥180.0° C., and an NEA≤2.0 seconds/µm.

6. The membrane of claim 5, wherein (i) the first layer and third layers comprise 75.0 wt % to 85.0 wt % of the first polyethylene and 15.0 wt % to 25.0 wt % of the second polyethylene based on the weight of the layer; (ii) the second layer comprises 10.0 wt % to 15.0 wt % of the polymethylpentene, 21.0 wt % to 35.0 wt % of the polypropylene, 25.0 wt % to 35.0 wt % of the first polyethylene, and 25.0 wt % to 35.0 wt/o of the second polyethylene, the weight percents being based on the weight of the second layer; (iii) the first polyethylene has an Mw of 1.0×10$^5$ to 0.90×10$^6$, an MWD of 3.0 to 10.0, and a terminal unsaturation amount <0.20 per 1.0×10$^4$ carbon atoms; (iv) the second polyethylene has an Mw of 1.0×10$^6$ to 5.0×10$^6$ and an MWD of about 4.0 to about 15.0; (v) the polymethylpentene has a Tm of 220.0° C. to 230.0° C. and an MFR of 10.0 dg/min to 40.0 dg/min; and (vi) the polypropylene has an Mw of 0.8×10$^6$ to 2.0×10$^6$, a Tm≥160.0° C., a ΔHm≥90.0 J/g, and an MWD of about 2.5 to about 6.0.

7. A battery separator film comprising the microporous membrane of claim 1.

8. A method of producing a microporous membrane comprising:
(a) forming a first mixture comprising a first diluent and a first polymer blend comprising ≤20.0 wt % polymethylpentene based on the weight of the first polymer blend;
(b) forming a second mixture comprising a second diluent and a second polymer blend comprising 10.0 wt % to 40.0 wt % polymethylpentene based on the weight of the second polymer blend, 21.0 wt % to 35.0 wt % polypropylene based on the weight of the second layer, and ≥20.0 wt % polyethylene based on the weight of the second layer;
(c) forming a third mixture comprising a third diluent and a third polymer blend comprising ≤20.0 wt % polymethylpentene based on the weight of the third polymer blend;
(d) producing a sheet comprising a first layer comprising the first mixture, a third layer comprising the third mixture, and a second layer comprising the second mixture, the second layer being located between the first and third layers, the first mixture having a substantially different composition from each of the first and third mixtures and the second layer having a thickness ≤2.0 times that of the first and third layers; and
(e) removing at least a portion of the first, second, and third diluents from the sheet.

9. The method of claim 8, wherein the first and third mixtures are substantially the same mixture.

10. The method of claim 8, wherein the first, second, and third diluents are substantially the same diluent.

11. The method of claim 8, wherein the second polymer blend comprises <40.0 wt % polypropylene and further comprises ≥20.0 wt % polyethylene based on the weight of the second polymer blend.

12. The method of claim 8, wherein the total amount of polypropylene and polymethylpentene in the second polymer blend is ≤65.0 wt % based on the weight of the second polymer blend.

13. The method of claim 8, wherein the polyethylene comprises a first polyethylene having an Mw<1.0×10$^6$ and a second polyethylene having an Mw≥1.0×10$^6$, the polypropylene is an isotactic polypropylene having an Mw>0.8×10$^6$, and the polymethylpentene has an Mw of 1.0×10$^4$ to 4.0×10$^6$ and a Tm≥200° C.

14. The method of claim 13, wherein (i) the first polymer blend and third polymer blend comprise 75.0 wt % to 85.0 wt % of the first polyethylene and 15.0 wt % to 25.0 wt % of the second polyethylene based on the weight of the polymer blend; (ii) the second polymer blend comprises 10.0 wt % to 15.0 wt % of the polymethylpentene, 21.0 wt % to 35.0 wt % of the polypropylene, 25.0 wt % to 35.0 wt % of the first polyethylene, and 25.0 wt % to 35.0 wt % of the second polyethylene, the weight percents being based on the weight of the second polymer blend; (iii) the first polyethylene has an Mw of 1.0×10$^5$ to 0.90×10$^6$, an MWD of 3.0 to 10.0, and a terminal unsaturation amount <0.20 per 1.0×10$^4$ carbon atoms; (iv) the second polyethylene has an Mw of 1.0×10$^6$ to 5.0×10$^6$ and an MWD of about 4.0 to about 15.0; (v) the polymethylpentene has a Tm of 220.0° C. to 230.0° C. and an MFR of 10.0 dg/min to 40.0 dg/min; and (vi) the polypropylene has an Mw of 0.8×10$^6$ to 2.0×10$^6$, a Tm≥160.0° C., a ΔHm≥90.0 J/g, and an MWD of about 2.5 to about 6.0.

15. The method of claim 8, further comprising cooling the sheet following step (d).

16. The method of claim 8, further comprising stretching the sheet in at least one direction before and/or after step (e).

17. The method of claim 16, wherein the stretching is conducted before and after step (e), and the stretching after step (e) is conducted while the sheet is exposed to a temperature of 120° C. to 132° C.

18. A microporous membrane made by the method of claim 8.

19. A battery comprising an anode, a cathode, an electrolyte, and at least one separator located between the anode and cathode, the separator comprising:
i. a first layer comprising ≤20.0 wt % polymethylpentene, based on the weight of the first layer, wherein the first layer comprises <20.0 wt % polypropylene and ≥60.0 wt % polyethylene based on the weight of the layer; and
ii. a second layer comprising 10.0 wt % to 40.0 wt % polymethylpentene based on the weight of the second layer, 21.0 wt % to 35.0% polypropylene based on the weight of the second layer, and ≥20.0 wt % polyethylene based on the weight of the second layer;
the second layer having a composition that is not the same as that of the first layer and the second layer having a thickness ≤2.0 times that of the first layer.

20. The battery of claim 19 and a load electrically connected to the battery.

21. The battery of claim 19, wherein the electrolyte contains lithium ions.

22. The battery of claim 21, wherein the battery is a lithium ion secondary battery used as a power source for an electric vehicle or hybrid electric vehicle.

23. The multilayer microporous membrane of claim 1, wherein the second layer has a thickness ≤1.1 times that of the first layer.

24. The multilayer microporous membrane of claim 1, wherein the second layer has a thickness ≤1.0 times that of the first layer.

25. A multilayer microporous membrane comprising:
   i. a first layer comprising ≤20.0 wt % polymethylpentene, based on the weight of the first layer; and
   ii. a second layer comprising 10.0 wt % to 40.0 wt % polymethylpentene based on the weight of the second layer, 21.0 wt % to 35.0 wt % polypropylene based on the weight of the second layer, and ≥20.0 wt % polyethylene based on the weight of the second layer;
   the second layer having a composition that is not substantially the same as that of the first layer and the second layer having a thickness ≤2.0 times that of the first layer.

* * * * *